(12) United States Patent
Imazawa et al.

(10) Patent No.: US 10,380,865 B2
(45) Date of Patent: Aug. 13, 2019

(54) MONITORING APPARATUS, METHOD AND SYSTEM OF THE SAME

(71) Applicant: Hitachi, Ltd., Tokyo (JP)

(72) Inventors: Kei Imazawa, Tokyo (JP); Takaharu Matsui, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/118,545

(22) Filed: Aug. 31, 2018

(65) Prior Publication Data
US 2019/0103006 A1    Apr. 4, 2019

(30) Foreign Application Priority Data

Oct. 4, 2017 (JP) ................................. 2017-193916

(51) Int. Cl.
*G08B 21/04* (2006.01)
*G06K 9/00* (2006.01)

(52) U.S. Cl.
CPC ..... *G08B 21/0423* (2013.01); *G06K 9/00664* (2013.01); *G06K 9/00771* (2013.01); *G08B 21/0476* (2013.01)

(58) Field of Classification Search
CPC ............ G08B 21/0423; G08B 21/0476; G06K 9/00664; G06K 9/00771
See application file for complete search history.

(56) References Cited

U.S. PATENT DOCUMENTS

2013/0088593 A1* 4/2013 Ishimoto ................. E02F 9/226
348/143

FOREIGN PATENT DOCUMENTS

JP    2010-211626 A    9/2010

* cited by examiner

*Primary Examiner* — Curtis B Odom
(74) *Attorney, Agent, or Firm* — Mattingly & Malur, PC

(57) ABSTRACT

The monitoring apparatus includes: a processing unit and a data storage unit, in which the data storage unit stores image data of a work situation including a worker and a work object and model data including data indicating that a combination of a positional relationship between an area of the worker and an area of the work object has appeared in the past, and in which the processing unit includes a recognition unit that recognizes the areas of the worker and the work object from the input image, a combination area specification unit that specifies the combination of the positional relationship of the recognized areas of the worker and the work object, a model acquisition unit that acquires the model data from the data storage unit, and an abnormality degree calculation unit that calculates an abnormality degree in the combination of the areas of the worker and the work object.

10 Claims, 7 Drawing Sheets

FIG. 3

R(Red)
G(Green)
B(Blue)

| 133 | 136 | 76 | 253 | 190 | 80 |
|---|---|---|---|---|---|
| 108 | 227 | 147 | 102 | 230 | 122 |
| 116 | 137 | 102 | 79 | 45 | 98 |
| 14 | 50 | 36 | 208 | 153 | 73 |
| 137 | 92 | 14 | 83 | 98 | 71 |
| 49 | 217 | 123 | 88 | 7 | 131 |
| 79 | 85 | 11 | 148 | 79 | 195 |
| 179 | 203 | 66 | 125 | 120 | 42 |

| x (401) | y (402) | WIDTH (403) | HEIGHT (404) |
|---|---|---|---|
| 10 | 10 | 100 | 50 |
| 400 | 300 | 85 | 30 |
| 200 | 400 | 150 | 80 |

FIG. 5

501 $(x_1, x_2, x_3, x_4) \times (y_1, y_2, y_3, y_4)$

| MODEL No. | FRAME No. |
|---|---|
| 1 | 1 |
|   | 2 |
|   | 3 |
| 2 | 1 |
|   | 2 |
|   | 3 |

701 = MODEL No. column, 702 = FRAME No. column

FIG. 8

| x | y | WIDTH | HEIGHT | x | y | WIDTH | HEIGHT | NORMAL PROBABILITY |
|---|---|---|---|---|---|---|---|---|
| $x_{11}$ | $y_{11}$ | $w_{11}$ | $h_{11}$ | $x_{21}$ | $y_{21}$ | $w_{21}$ | $h_{21}$ | $P_1$ |
| $x_{11}$ | $y_{11}$ | $w_{11}$ | $h_{11}$ | $x_{22}$ | $y_{22}$ | $w_{22}$ | $h_{22}$ | $P_2$ |
| $x_{12}$ | $y_{12}$ | $w_{12}$ | $h_{12}$ | $x_{21}$ | $y_{21}$ | $w_{21}$ | $h_{21}$ | $P_3$ |
| $x_{12}$ | $y_{12}$ | $w_{12}$ | $h_{12}$ | $x_{22}$ | $y_{22}$ | $w_{22}$ | $h_{22}$ | $P_4$ |
| $x_{13}$ | $y_{13}$ | $w_{13}$ | $h_{13}$ | $x_{21}$ | $y_{21}$ | $w_{21}$ | $h_{21}$ | $P_5$ |
| $x_{13}$ | $y_{13}$ | $w_{13}$ | $h_{13}$ | $x_{22}$ | $y_{22}$ | $w_{22}$ | $h_{22}$ | $P_6$ |

801, 802, 803, 804, 805, 806, 807, 808, 809

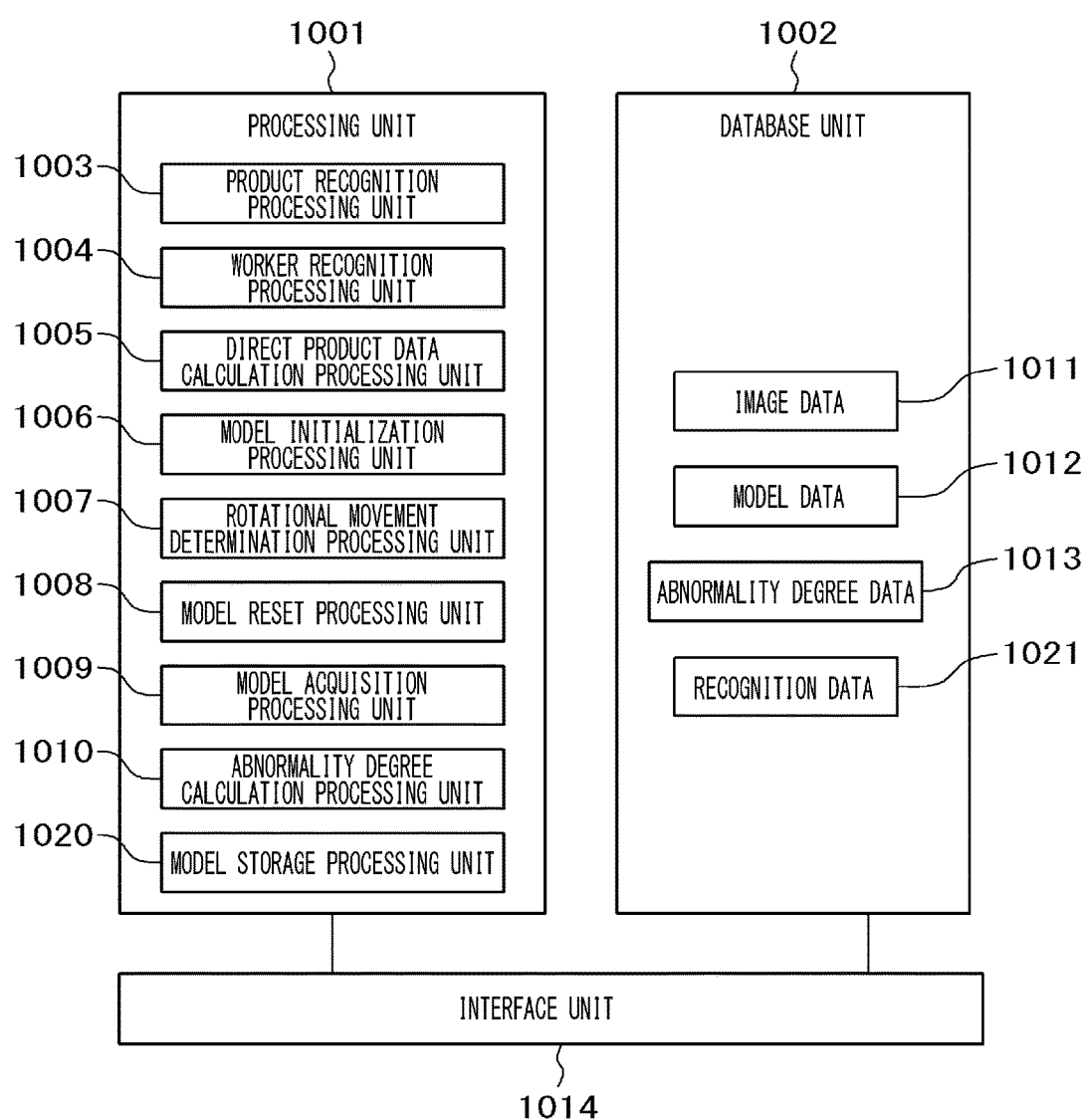

MONITORING APPARATUS, METHOD AND SYSTEM OF THE SAME

CROSS-REFERENCE TO RELATED APPLICATION

This application claims the priority of Japanese Patent Application No. 2017-193916 filed Oct. 4, 2017, which is incorporated herein by reference in its entirety.

TECHNICAL FIELD

The present invention relates to a monitoring apparatus, and in particular, to a technique suitable for monitoring a work situation between a worker and a work object.

BACKGROUND ART

In JP 2010-211626 A, a system is disclosed which analyzes a traffic line and a position of a worker and monitors the traffic line of the worker in order to reduce unnecessary movement and improve efficiency of each individual work.

An example of related art includes JP 2010-211626 A

SUMMARY OF THE INVENTION

Technical Problem

The above-described Patent Document 1 describes a method of performing an abnormality detection based on a relative positional relationship between a coordinate of a product and a worker.

However, if the abnormality is detected only by the relative positional relationship, an abnormality with respect to an absolute position or an abnormality caused by a combination of the relative positional relationship and an absolute positional relationship may be overlooked.

In this regard, an object of the present invention is to provide a monitoring apparatus capable of detecting an abnormality with respect to a relative positional relationship, an absolute positional relationship, and a combination thereof with respect to a positional relationship between a work object and a worker.

Solution to Problem

As a preferred example of the present invention, there is a monitoring apparatus including a processing unit and a data storage unit, in which the data storage unit stores image data of a work situation including a worker and a work object and model data including data indicating that a combination of a positional relationship between an area of the worker and an area of the work object has appeared in the past, and in which the processing unit includes a recognition unit that inputs an image of the work situation and recognizes the areas of the worker and the work object from the input image, a combination area specification unit that specifies the combination of the positional relationship of the recognized areas of the worker and the work object, a model acquisition unit that acquires the model data from the data storage unit, and an abnormality degree calculation unit that calculates an abnormality degree in the combination of the positional relationship of the areas of the worker and the work object based on the combination of the areas of the worker and the work object specified by the combination area specification unit and the model data acquired by the model acquisition unit.

According to the present invention, it is possible to obtain a monitoring apparatus capable of detecting an abnormality with respect to a relative positional relationship, an absolute positional relationship, and a combination thereof with respect to a positional relationship between a work object and a worker.

BRIEF DESCRIPTION OF THE DRAWINGS

FIG. 3 is a diagram describing image data.

FIG. 4 is a diagram explaining a product recognition result and a worker recognition result.

FIG. 5 is a diagram explaining a concept of direct product calculation.

FIG. 7 is a diagram explaining a model management number.

FIG. 8 is a diagram illustrating an example of a model.

FIG. 10 is a diagram illustrating a configuration of a monitoring apparatus.

DESCRIPTION OF THE EMBODIMENTS

Figure 1:
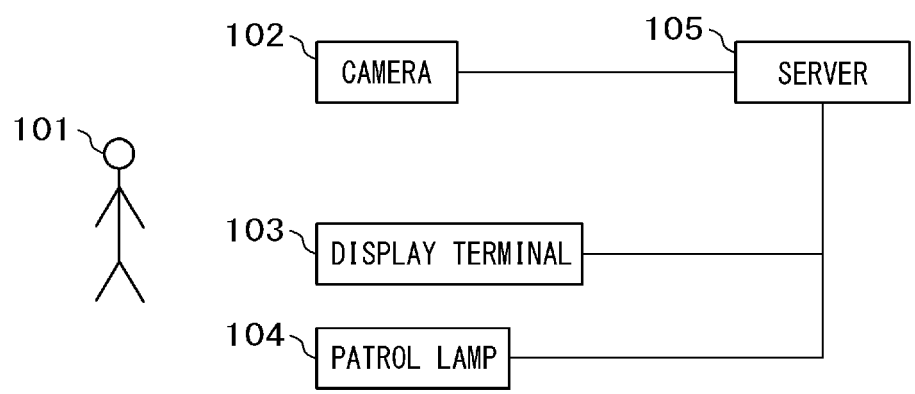
FIG. 1 is a diagram illustrating a configuration of a monitoring system according to an embodiment.

Hereinafter, embodiments will be described with reference to the drawings. FIG. 1 is a diagram illustrating a configuration of a monitoring system. In this system, a work situation of a worker (101) working in a factory is photographed with a camera (102) installed in the factory. The camera (102) is connected to a server (105) as a monitoring apparatus via a network. Upon receiving data from the camera (102), the server (105) starts a monitoring process. Although an internal configuration of the server (105) is not illustrated, a CPU in the server (105) may read and execute the program from a memory to execute each step of a monitoring process described later or may execute the monitoring process using a dedicated hardware. The server (105) is connected to a display terminal (103) and a patrol lamp (104) installed in the factory via the network.

As a result of performing an abnormality determination processing, when determining that the abnormality is present, the server (105) transmits an abnormality signal to the display terminal (103) and the patrol lamp (104). Upon receiving the abnormality signal, the display terminal (103) and the patrol lamp (104) notify the worker (101) working in the factory of the occurrence of the abnormality. A display example by the display terminal (103) will be described later. The patrol lamp (104) notifies the worker (101) of the occurrence of abnormality by emitting light.

Figure 2:
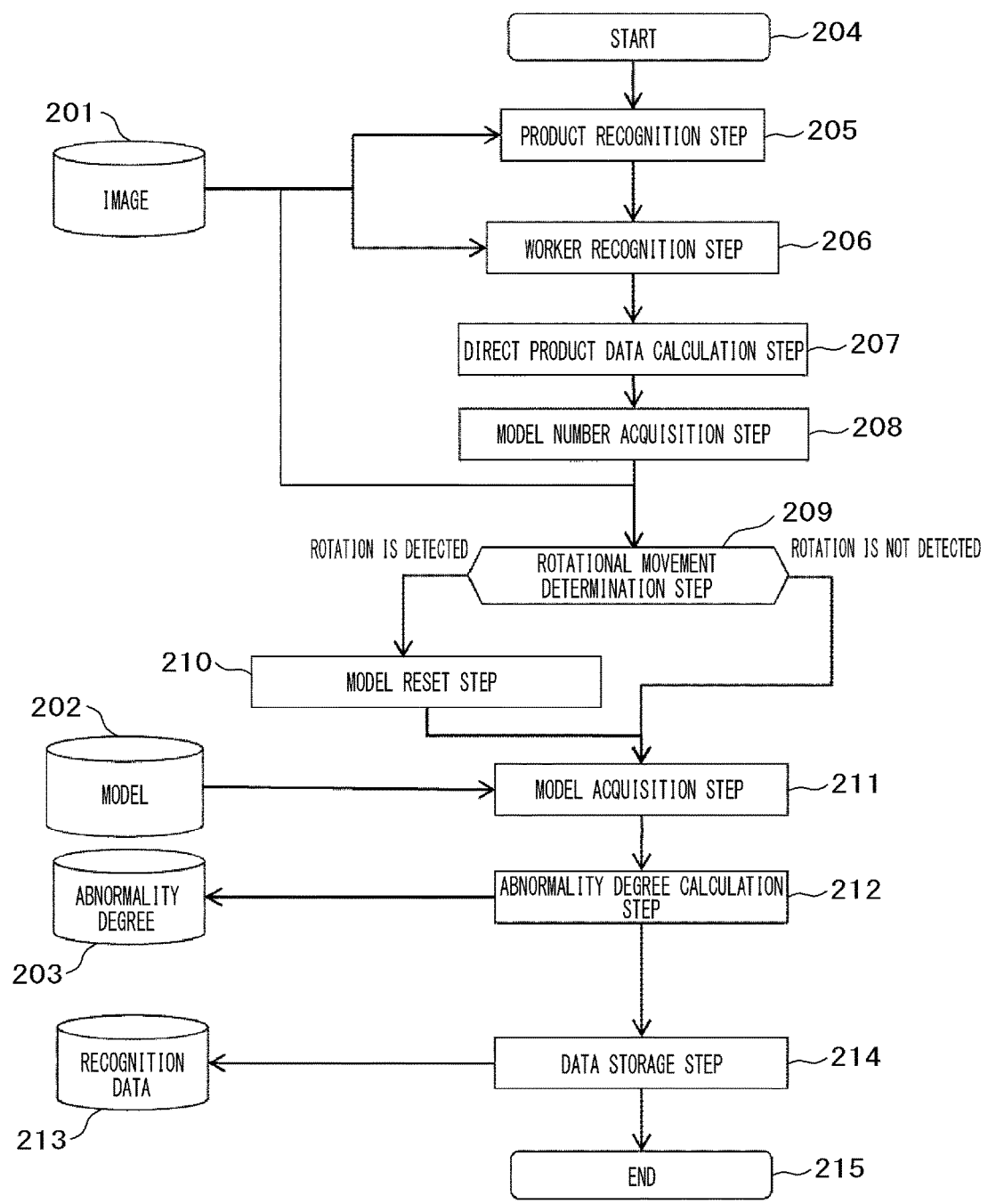
FIG. 2 is a diagram illustrating a flowchart of a monitoring process.

FIG. 2 is a flowchart of the monitoring process. This flowchart is executed by the server (105) in FIG. 1. This flowchart is executed every time one image data is acquired. The image data is acquired from the camera (102) in FIG. 1. Further, in addition to the aforementioned method, there is a method of acquiring the image data using a system, for example, a monitoring camera system or the like different from the camera (102) in FIG. 1, storing the image data in a database or a file folder, and acquiring the image data.

In the flowchart, an acquisition source of the image data is represented by an image (201). A frequency of execution is based on a preset frequency. Normally, the frequency of the execution ranges from 5 to 30 times per second. First, when the processing is started at a start (204), the image (201) is acquired, and a product recognition step (205) and a worker recognition step (206) are executed. FIG. 3 illustrates a data format of the image (201). For each color of red (R) (301), green (G) (302), and blue (B) (303), the image data holds information on an intensity of the color in matrix form. The number of rows and the number of columns of the matrix coincide with the number of pixels in a vertical direction and a column direction of the image (201).

As illustrated in FIG. 3, the data of each component may be held as an integer in the range of 0 to 255 or may be held as a decimal in the range of 0 to 1. In the product recognition step (205), a position and a size of the product to be worked by the worker shown in the image (201) are specified. Data of the position and the size of the product specified in the product recognition step (205) is output in a format illustrated in FIG. 4.

In the example of FIG. 4, three products as examples of work objects are recognized. Each row is information on the circumscribed quadrangle of a region in which the product is shown in the image (201). Usually, each side of the circumscribed quadrangle is specified to be parallel to the x axis or the y axis. A first column (401) indicates the x coordinate of an upper left vertex of the circumscribed quadrangle, and a second column (402) indicates the y coordinate of the upper left vertex of the circumscribed quadrangle. Further, a third column (403) indicates a width of the circumscribed quadrangle, and a fourth column (404) indicates a height of the circumscribed quadrangle. Incidentally, normally, an origin of the coordinates is an upper left point of the image (201), the x axis is treated as a right direction, and the y axis is treated as a downward direction.

In the product recognition step (205), as the method of specifying the position and the size of the product shown in the image (201), there is a method of specifying an area of the product by assuming an area of pixels of a specific color to be the area of the product when it is assumed that the product has the specific color. When it is not possible to assume that the product has a specific color, there may be also a method of using a Convolution Neural Network or the like to cause a computer to learn a feature quantity of a form of the product in advance and specifying an area having a similar feature quantity.

In the worker recognition step (206), a position and a size of the worker shown in the image (201) are specified. The data of the position and the size of the worker specified in the worker recognition step (206) is output in the same format as the format illustrated in FIG. 4, which is an output of the product recognition step (205). In the worker recognition step (206), as a method of specifying the position and the size of the worker shown in the image (201), there is a method of specifying an area of the worker by assuming an area of pixels of a specific color to be the area of the worker when a color is assumed such as when the worker wears cloths of the specific color.

When it is not possible to assume that the worker has a specific color, there may be also a method of causing a computer to learn a feature quantity of a form of the worker in advance and specifying an area having a similar feature quantity. When specifying the worker, a feature quantity called an HOG feature quantity is often used. Next, in a direct product data calculation step (207), a direct product of the data of the position and the size of the product acquired in the product recognition step (205) and the data of the position and the size of the worker acquired in the worker recognition step (206) is taken. The data of the positions and the sizes of the worker and the product constituted by the x coordinate and the y coordinate are data which can specify the relative positional relationship together with the absolute positional relationship between the product and the worker.

FIG. 5 illustrates an example in which a direct product of two pieces of data is calculated. In this example, the two pieces of data (501) before calculating the direct product are four-dimensional data of $(x_1, x_2, x_3, x_4)$ and $(y_1, y_2, y_3, y_4)$, respectively. A result (502) of the direct product of the two pieces of data is 8-dimensional data in which the two pieces of data are arranged.

For example, $x_1$ is an x coordinate of an upper left vertex of the circumscribed quadrangle outputted in the product recognition step (205), $x_2$ is the y coordinate of the upper left vertex of the circumscribed quadrangle outputted in the product recognition step (205), $x_3$ is a width of the circumscribed quadrangle outputted in the product recognition step (205), and $x_4$ is a height of the circumscribed quadrangle outputted in the product recognition step (205). Further, $y_1$ is the x coordinate of an upper left vertex of the circumscribed quadrangle outputted in the worker recognition step (206), $y_2$ is the y coordinate of the upper left vertex of the circumscribed quadrangle outputted in the worker recognition step (206), $y_3$ is a width of the circumscribed quadrangle outputted in the worker recognition step (206), and $y_4$ is a height of the circumscribed quadrangle outputted in the worker recognition step (206).

Figure 6:
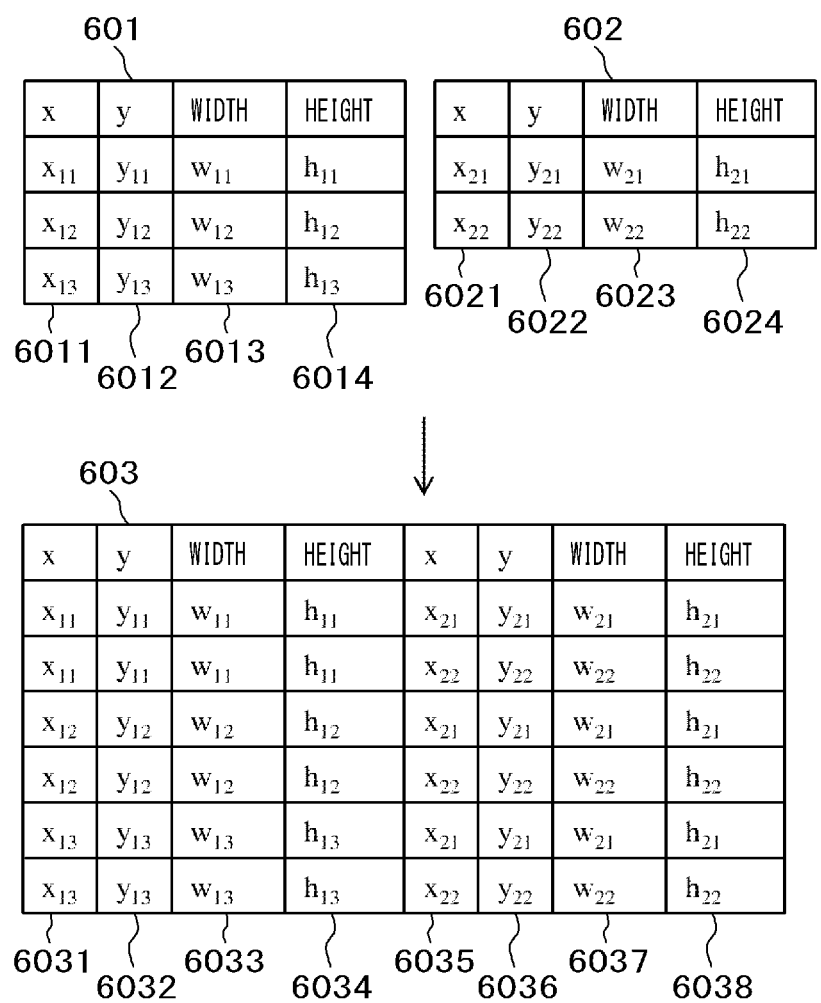
FIG. 6 is a diagram illustrating an example of direct product calculation.

As illustrated in FIG. 6, when a plurality of areas are specified in the product recognition step (205) and the worker recognition step (206) respectively, a plurality of direct product data are also calculated. The calculated direct product data is data for specifying respective combinations of the areas of the plurality of workers and the plurality of products. For example, assume that three areas are specified as a result (601) of the product recognition step (205). In the result (601) of the product recognition step (205), a first column (6011) indicates the x coordinate of the upper left vertex of the circumscribed quadrangle, a second column (6012) indicates the y coordinate of the upper left vertex of the circumscribed quadrangle. Further, a third column (6013) indicates the width of the circumscribed quadrangle, and a fourth column (6014) indicates the height of the circumscribed quadrangle.

Further, it is assumed that two areas are specified as a result (602) of the worker recognition step (206). In the result (602) of the worker recognition step (206), a first column (6021) is the x coordinate of the upper left vertex of the circumscribed quadrangle, and a second column (6022) is the y coordinate of the upper left vertex of the circumscribed quadrangle. Further, a third column (6023) indicates the width of the circumscribed quadrangle, and a fourth column (6024) indicates the height of the circumscribed quadrangle. At this time, six pieces of direct product data (603) are calculated. In the direct product data, a first column (6031) indicates the x coordinate of the upper left vertex of the circumscribed quadrangle of the result of the product recognition step (205), a second column (6032) indicates the y coordinate of the upper left vertex of the circumscribed quadrangle of the result of the product recognition step (205). Further, a third column (6033) indicates the width of the circumscribed quadrangle of the result of the product recognition step (205), and a fourth column (6034) indicates the height of the circumscribed quadrangle of the result of the product recognition step (205).

Further, a fifth column (6035) indicates the x coordinate of the upper left vertex of the circumscribed quadrangle of the result of the worker recognition step (206), and a sixth column (6036) indicates the y coordinate of the upper left vertex of the circumscribed quadrangle of the result of the worker recognition step (206). Further, a seventh column (6037) indicates the width of the circumscribed quadrangle of the result of the worker recognition step (206), and an eighth column (6038) indicates the height of the circumscribed quadrangle of the result of the worker recognition step (206).

Next, the process proceeds to a model number acquisition step (208). In this step, a model management number used for an abnormality detection is acquired. An example of a model management number (700) is illustrated in FIG. 7. The model management number (700) is constituted by a model No. (701) and a frame No. (702). The acquired model No. (701) is the model No. (701) used for the abnormality detection when executing this flowchart last time. In addition, the acquired frame No. (702) is a number obtained by adding 1 to the frame No. (702) used for the abnormality detection when this flowchart was executed last time. However, when this flowchart is executed for the first time, it is not possible to acquire the model No. (701) and the frame No. (702) used at the last execution. Therefore, only when the flowchart is executed for the first time, the model No. (701) and the frame No. (702) are initialized to be 1 respectively. The model management number (700) may be stored in a database unit (1002) of FIG. 10 as model data (1012) or may be stored in the database unit (1002) apart from the model data (1012).

In addition, the model data (1012) assigned with each management number is stored in a model (202). FIG. 8 illustrates a format of the stored model data (1012). In the model data, normal probabilities are stored for combinations of all the values that each direct product data acquires. The method of creating this model itself will be described later.

In FIG. 8, a first column (801) indicates the x coordinate of the upper left vertex of the circumscribed quadrangle of a result of the product recognition step (205), and a second column (802) indicates the y coordinate of the upper left vertex of the circumscribed quadrangle of the result of the product recognition step (205). Further, a third column (803) indicates the width of the circumscribed quadrangle of the result of the product recognition step (205), and a fourth column (804) indicates the height of the circumscribed quadrangle of a result of the product recognition step (205). However, in each case, all possible combinations of values are stored. In FIG. 8, a fifth column (805) indicates the x coordinate of the upper left vertex of the circumscribed quadrangle of a result of the worker recognition step (206), and a sixth column (806) indicates the y coordinate of the upper left vertex of the circumscribed quadrangle of the result of the worker recognition step (206).

Further, a seventh column (807) indicates the width of the circumscribed quadrangle of the result of the worker recognition step (206), and an eighth column (808) indicates the height of the circumscribed quadrangle of the result of the worker recognition step (206). However, in each case, all possible combinations of values are stored. In FIG. 8, a ninth column (809) indicates the stored normal probability, the stored values are from 0 to 1, and, in there, the normal probability of existence of the worker and the product is stored. This example is an example of data indicating that a specific combination of relative and absolute positional relationship of the worker and the product has appeared in the past.

Next, in a rotational movement determination step (209), a rotation of the product is determined based on the image (201). In the determination method, the rotation can be detected by calculating a velocity vector of each pixel by an image processing method called an optical flow in the area in the product recognition step (205) and evaluating whether or not each velocity vector is circular. Further, the number of rotation can be detected. The result of the rotational movement determination step holds whether the rotation has been performed or not, as a logical type variable.

When the rotation is detected in the rotational movement determination step (209), the process proceeds to a model reset step (210), 1 is added to the model No. (701), the frame No. (702) is initialized to be 1, and the process proceeds to a model acquisition step (211). By performing the model reset, it is possible to manage model data (1012) when the product has rotated with a new model No. (701). As a result, it is possible to extract model data (1012) in the case of rotation, based on the model No. (701) when the product has rotated previously to obtain an abnormality degree during rotation. A management No. or a flag that identifies whether or not the model is a model having rotated may be attached to the model data (1012).

Further, when the rotation has not been detected in the rotational movement determination step (209), the process proceeds to the model acquisition step (211) without going through the model reset step (210). In the model acquisition step (211), model data is acquired from the model (202). The user may selectively designate the model No. (701) of the model data to be acquired.

In the abnormality degree calculation step (212), the abnormality degree is calculated based on the model information acquired in the model acquisition step (211). Specifically, normal probability of a column corresponding to direct product data which is an object of abnormality detection in the model data is acquired. An abnormality degree (203) is set by subtracting the normal probability from 1 and is stored. The abnormality degree (203) is stored together with time information, and development of the abnormality degree may be output to the display terminal (103) and displayed on the display terminal (103). Subsequently, in a data storage step (214) in FIG. 2, the data recognized in the product recognition step (205) and the worker recognition step (206) is saved as recognition data (213).

Figure 9:
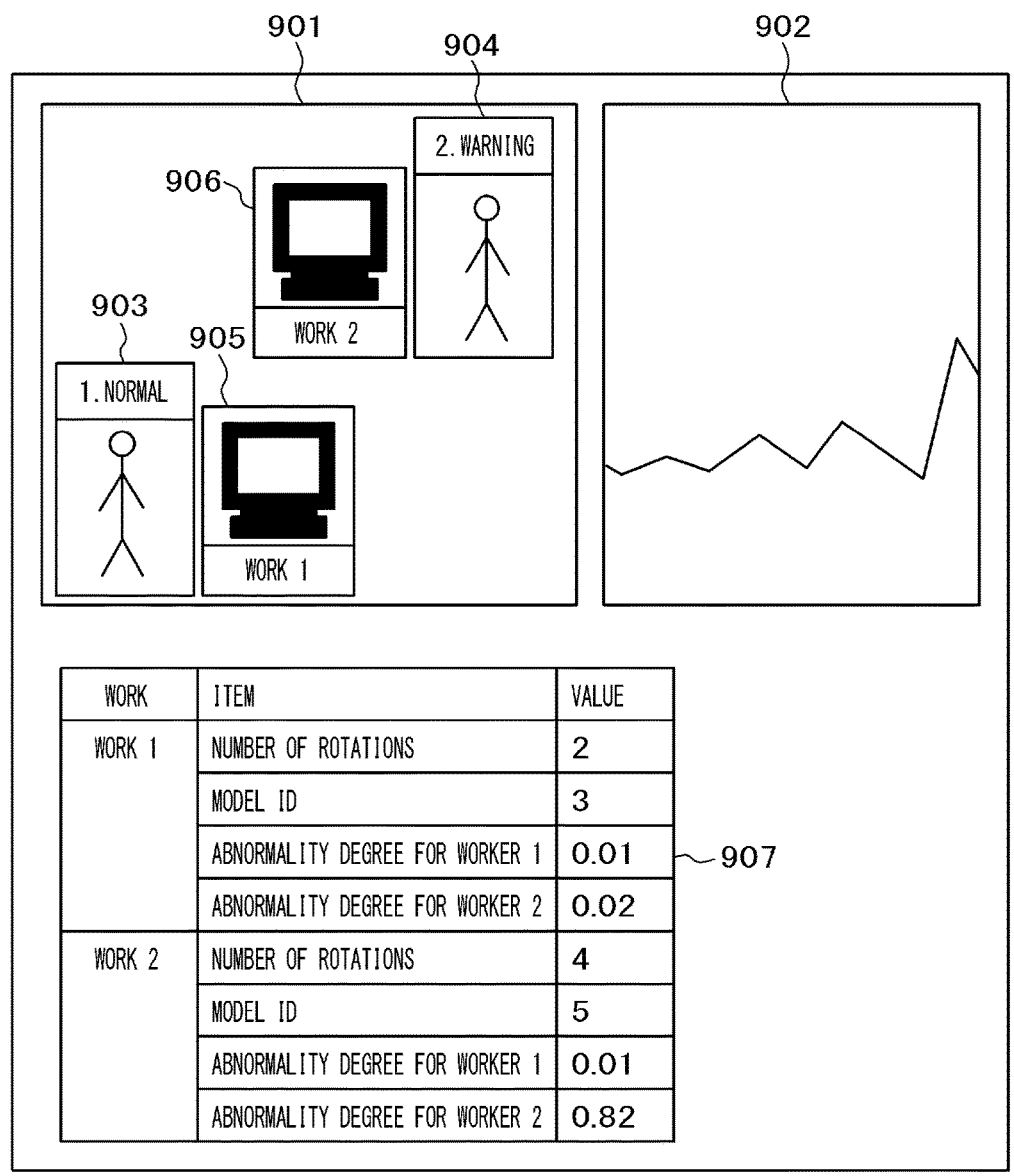
FIG. 9 is a diagram illustrating an example of display on a display terminal.

FIG. 9 illustrates an example of an output by the display terminal (103) in FIG. 1. FIG. 9 illustrates a screen of the display terminal (103). In a display area (901) on the left side, an image obtained by superimposing a result of abnormality determination on a real time image is displayed. This drawing illustrates that a worker 1 on the left side is normal (903). In addition, a worker 2 on the right side is illustrated as being abnormal (904). In this drawing, a work 1 (905) and a work 2 (906) indicate a recognition result by the product recognition step (205) of this system. In this example, two products are recognized. Further, in this drawing, a table (907) at the bottom of the screen indicates an abnormality degree. Rows in the table (907) indicate information on each work. In this example, it is indicated that the work 1 was rotated twice during manufacturing (number of rotation). In addition, a serial number assigned to a model used for abnormality detection is indicated as being 3. Further, the abnormality degree for the worker 1 is indicated as being 0.01, and the abnormality degree for the worker 2 is indicated as being 0.02.

Further, it is indicated that the work 2 was rotated four times during the manufacturing (number of rotation). In addition, the serial number assigned to the model used for the abnormality detection is indicated as being 5. In addition, the abnormality degree for the worker 1 is indicated as being 0.01, and the abnormality degree for the worker 2 is indicated as being 0.82. In a display area (902) on the right side, development of the abnormality degree is indicated. Since the development of the abnormality degree stores the abnormality degree (203) calculated by the flowchart illustrated in FIG. 2, the development displays data of a past history for a certain period of time set in advance.

FIG. 10 is a block diagram illustrating a configuration of a monitoring apparatus. This system includes a processing unit (1001), a database unit (1002), and an interface unit (1014). The processing unit (1001) and the database unit (1002) are respectively connected to the interface unit (1014) via a network. The processing unit (1001) includes a product recognition processing unit (1003), a worker recognition processing unit (1004), a direct product data calculation processing unit (1005), a model initialization processing unit (1006), a rotational movement determination processing unit (1007), a model reset processing unit (1008), a model acquisition processing unit (1009), an abnormality degree calculation processing unit (1010), and a model storage processing unit (1020).

The product recognition processing unit (1003) executes the product recognition step (205) in FIG. 2. The worker recognition processing unit (1004) executes the worker recognition step (206) in FIG. 2. The direct product data calculation processing unit (1005) executes the direct product data calculation step (207) in FIG. 2. The model initialization processing unit (1006) executes the model number acquisition step (208) in FIG. 2. The rotational movement determination processing unit (1007) executes the rotational movement determination step (209) in FIG. 2. The model reset processing unit (1008) executes the model reset step (210) in FIG. 2. The model acquisition processing unit (1009) executes the model acquisition step (211) in FIG. 2. The abnormality degree calculation processing unit (1010) executes the abnormality degree calculation step (212) in FIG. 2. The model storage processing unit (1020) executes the data storage step (214) in FIG. 2.

The database unit (1002) stores image data (1011), model data (1012), abnormality degree data (1013), and recognition data (1021). The image data (1011) corresponds to the image (201) in FIG. 2. The model data (1012) corresponds to the model (202) in FIG. 2. The abnormality degree data (1013) corresponds to the abnormality degree (203) in FIG. 2. The recognition data (1021) corresponds to the recognition data (213) in FIG. 2. The interface unit (1014) inputs the image data from the camera (102) in FIG. 1 to the database unit (1002) and the processing unit (1001), outputs the abnormality degree or the data of development of the abnormality degree to the display terminal (103) or outputs the abnormality to the patrol lamp (104).

Finally, a method of constructing the model in FIG. 8 will be described. In the data storage step (214) in FIG. 2, the data recognized in the product recognition step (205) and the worker recognition step (206) is stored as the recognition data (213). After a process flow of FIG. 2 is repeated several times, the model is updated collectively. Specifically, the model storage processing unit (1020) calculates an occurrence frequency for each direct product coordinate with respect to the recognition data (213) in the past, sets its occurrence probability as normal probability, and stores the model data (1012) obtained by updating the column of the normal probability in the database unit (1002).

The normal probability is obtained by determining based on the occurrence frequency of how many times the direct product coordinate which is the same as the direct product coordinate as an object of the abnormality detection occurred in the past. For example, the normal probability may be obtained as a ratio of the number of the direct product as the object of the abnormality detection to the number of all the direct products in the same model No. Alternatively, the user and the like may specify a range of model No., and the normal probability may be obtained from the past occurrence frequency in a plurality of model data (1012).

According to the present embodiment, it is possible to detect both a work abnormality relating to a positional relationship of each product and each worker and a work abnormality relating to a work area in a work site where the same work is repeated. Further, even when the product is rotated, the abnormality detection can be performed accurately. In the embodiments, examples of the products are given. However, the present invention is not limited to the products, but may be applied as long as the work object is subject to an image recognition together with the worker in a work situation.

What is claimed is:

1. A monitoring apparatus comprising a processing unit and a data storage unit,
   wherein the data storage unit stores image data of a work situation including a worker and a work object and model data including data indicating that a combination of a positional relationship between an area of the worker and an area of the work object has occurred in the past, and
   wherein the processing unit includes:
   a recognition unit that inputs an image of the work situation and recognizes the areas of the worker and the work object from the input image;
   a combination area specification unit that specifies the combination of the positional relationship of the recognized areas of the worker and the work object;
   a model acquisition unit that acquires the model data from the data storage unit; and
   an abnormality degree calculation unit that calculates an abnormality degree in the combination of the positional relationship of the areas of the worker and the work object based on the combination of the areas of the worker and the work object specified by the combination area specification unit and the model data acquired by the model acquisition unit.

2. The monitoring apparatus according to claim 1, wherein the recognition unit specifies the area with a position and a size that are representative of the area of the worker and the area of the work object,
   wherein the combination area specification unit is a direct product calculation unit that calculates a direct product based on the position and the size specified by the recognition unit, and
   wherein the abnormality degree calculation unit calculates the abnormality degree between each worker and each work object based on the direct product and the model data.

3. The monitoring apparatus according to claim 2, wherein the direct product calculation unit calculates direct products of a plurality of combinations in the positional relationship between the worker and the work object, the abnormality degree calculation unit calculates the abnormality degree between the worker and the work object based on the calculated direct products and the model data, and an interface unit outputs the abnormality degree to a display terminal, and
   wherein the abnormality degree calculation unit stores a history of the calculated abnormality degree in the data storage unit, and the interface unit outputs the history of the abnormality degree to the display terminal.

4. The monitoring apparatus according to claim 2, wherein the representative position is a coordinate of any one of vertexes of a circumscribing quadrangle surrounding the worker or the work object, the size is a width and a height of the circumscribed quadrangle, and the direct product calculation unit calculates the direct product based on the coordinate of the vertex, and the width and the height of the circumscribed quadrangle.

5. The monitoring apparatus according to claim 4, further comprising a model storage processing unit that updates the model data,
   wherein the model storage processing unit acquires an occurrence frequency for the direct product, calculates a normal probability for the direct product, and stores the normal probability as the model data, and
   wherein the abnormality degree calculation unit extracts the normal probability from the model data, based on the direct product corresponding to the specified combination of the positional relationship of the areas of the worker and the work object, and calculates the abnormality degree of the specified combination of the positional relationship of the areas of the worker and the work object, based on the extracted normal probability.

6. The monitoring apparatus according to claim 1, further comprising a rotational movement determination unit that detects whether or not the work object has been rotated based on the input image of the work situation,
   wherein, when the work object has been rotated, a model reset unit updates a model number.

7. The monitoring apparatus according to claim 2, wherein the direct product is 8-dimensional data obtained by combining 4-dimensional data of the position and the size of each worker and each work object for which the abnormality degree is to be acquired.

8. A monitoring method comprising:
   a first step of inputting image data of a work situation including a worker and a work object;
   a second step of recognizing areas of the worker and the work object from the input image data;
   a third step of specifying a combination of the positional relationship of the recognized areas of the worker and the work object;
   a fourth step of acquiring, from a storage unit, model data including data indicating that the combination of the positional relationship of the area of the worker and the area of the work object has occurred in the past;
   a fifth step of calculating an abnormality degree in the combination of the positional relationship of the areas of the worker and the work object, based on the specified combination of the positional relationship of the areas of the worker and the work object and the acquired model data;
   a sixth step of outputting the abnormality degree in the combination of the positional relationship of the areas of the worker and the work object to an apparatus; and
   a seventh step of updating the model data of the storage unit.

9. A monitoring system comprising a monitoring apparatus including a processing unit and a data storage unit and an external apparatus that outputs a situation relating to an abnormality from the monitoring apparatus,
   wherein the data storage unit stores image data of a work situation including a worker and a work object and model data including data indicating that a combination of a positional relationship between an area of the worker and an area of the work object has occurred in the past, and
   wherein the processing unit includes:
   a recognition unit that inputs an image of the work situation and recognizes the areas of the worker and the work object from the input image;
   a model acquisition unit that acquires the model data from the data storage unit;
   an abnormality degree calculation unit that calculates an abnormality degree in the combination of the areas of the worker and the work object based on the recognized areas of the worker and the work object and the model data; and
   an interface unit that outputs data relating to the abnormality to the external apparatus.

10. The monitoring system according to claim 9, wherein the external apparatus is a display terminal, and the display terminal displays the data relating to the abnormality output from the interface unit.

* * * * *